(12) United States Patent
Christoph et al.

(10) Patent No.: US 7,367,228 B2
(45) Date of Patent: May 6, 2008

(54) (SEAT) FORCE MEASURING DEVICE WITH A SPRING HOUSING, INDUCTIVE SENSOR AND STOPS

(75) Inventors: Markus Christoph, Regensburg (DE); Henderikus-L Offereins, Langquaid (DE)

(73) Assignee: Siemens Aktiengesellschaft, Munich (DE)

( * ) Notice: Subject to any disclaimer, the term of this patent is extended or adjusted under 35 U.S.C. 154(b) by 101 days.

(21) Appl. No.: 10/571,019

(22) PCT Filed: Sep. 7, 2004

(86) PCT No.: PCT/EP2004/052061

§ 371 (c)(1),
(2), (4) Date: Mar. 8, 2006

(87) PCT Pub. No.: WO2005/026677

PCT Pub. Date: Mar. 24, 2005

(65) Prior Publication Data

US 2007/0028703 A1  Feb. 8, 2007

(30) Foreign Application Priority Data

Sep. 8, 2003  (DE) ............................... 103 41 334

(51) Int. Cl.
*G01L 1/04* (2006.01)
(52) U.S. Cl. ...................................................... 73/161
(58) Field of Classification Search .................... 73/161
See application file for complete search history.

(56) References Cited

U.S. PATENT DOCUMENTS 3,625,126 A * 12/1971 Land ........................... 396/32
4,114,123 A * 9/1978 Grenier ......................... 335/42
4,701,660 A * 10/1987 Baumgartner et al. ...... 310/338
4,827,240 A    5/1989 Häfner
6,087,598 A    7/2000 Munch
6,129,168 A   10/2000 Lotito et al.
6,323,443 B1  11/2001 Aoki et al.
6,367,886 B1 * 4/2002 Shaw .............................. 303/3
6,843,232 B2 * 1/2005 Keesee et al. .............. 123/463
2004/0129095 A1 * 7/2004 Churchill et al. .......... 73/866.5

FOREIGN PATENT DOCUMENTS

| DE | 23 506      | 8/1962 |
| DE | 31 42 509 A1 | 5/1983 |
| DE | 36 27 127 A1 | 2/1988 |

(Continued)

*Primary Examiner*—Max Noori
(74) *Attorney, Agent, or Firm*—Laurence A. Greenberg; Werner H. Stemer; Ralph E. Locher

(57) ABSTRACT

The two housing parts are used as springing means which are mounted behind each other, thereby extending the full spring path. Despite the soft springs obtained by the housing, the individual housing parts can be manufactured from a stable material so that they remain dimensionally stable over a long-term period even when subjected to heavy stress by virtue of the fact that they are arranged between a vehicle seat and the chassis of the vehicle, thereby meeting the high quality standards required by the vehicle industry. Complex successive positioning of the springs inside the housing is avoided. As a result, it is possible to produce a force measuring device which is particularly compact, stable and economical. A coil with a core is used as an inductive deflection sensor.

15 Claims, 5 Drawing Sheets

FOREIGN PATENT DOCUMENTS

| | | |
|---|---|---|
| DE | 199 25 877 A1 | 1/2000 |
| DE | 199 24 002 A1 | 11/2000 |
| DE | 199 46 352 A1 | 3/2001 |
| DE | 101 45 367 A1 | 4/2003 |
| DE | 101 45 369 A1 | 4/2003 |
| DE | 103 03 706 A1 | 4/2005 |
| FR | 2 459 462 | 1/1981 |

* cited by examiner

(SEAT) FORCE MEASURING DEVICE WITH A SPRING HOUSING, INDUCTIVE SENSOR AND STOPS

FIELD OF THE INVENTION

The invention relates to a force measuring device. The force measuring device has a housing onto which are mounted two force introduction means which are movable by spring action. Mounted between the two force introduction means is a deflection sensor which is capable of registering the deflection of the force introduction means and passing it on in the form of an electrical signal.

BACKGROUND OF THE INVENTION

In the field of occupant protection for motor vehicles it has become more and more important in the last several years to adjust the triggering of occupant retention means, for example front airbags, side airbags, knee airbags, curtain airbags, etc., to the vehicle occupants in the deployment area of the said occupant retention means or even to suppress said triggering in order, on the one hand, to save on subsequent repair costs following an unnecessary deployment, for example in the case of an unoccupied seat, not to trigger an occupant retention means from the outset, and, on the other hand, in order not to put certain groups of persons, for example children or very small adults, at additional risk due to an unsuitable triggering behavior of the occupant retention means. It is therefore important not only to detect the presence of a person on the motor vehicle seat, but in addition even to determine classifying characteristics of said person, for example the body weight. Deserving of mention in this context is the crash standard FMVSS 208, compliance with which is increasingly required by vehicle manufacturers and which stipulates a classification of a person according to his or her weight in order, in the event of a collision, to adjust the activation of an occupant retention means if necessary in a suitable manner to the person detected.

Various devices are known for detecting the weight or the weight distribution of a person on a motor vehicle seat, for example pressure-sensitive sensor seat mats as described in the unexamined published German specification DE 101 60 121 A1, or force measuring devices which are mounted between the vehicle seat and the vehicle floor and in this way register the weight of a vehicle occupant. The sensors used in this case are, for example, capacitive sensors, illustrated for example in the unexamined published German specification DE 199 25 877 A1, column 7, line 30, and FIG. 1 in that document. However, use is also made of inductive sensors, such as described, for example, in the US patent U.S. Pat. No. 6,129,168 or the unpublished German patent application 10303706.3.

In the last-cited US patent specification the force measuring device comprises a housing (50) which is composed of a deflectable housing portion (56) and a rigid housing portion (52), as can be derived from the abstract pertaining thereto and also from FIG. 3. The displacement of the movable housing part (50) is registered by an inductive deflection sensor (52).

In particular in the preferred area of application of such a force measuring device, namely for occupant weight detection in vehicles, it has however been shown in companies' in-house development activities that when sufficiently and lastingly dimensionally stable housing materials are used, the spring constant of just one spring means in the last-cited form of just one housing portion is not sufficient to be able at the same time to apply measurement technology for registering the very large measurement range of between 0 and up to 1.2 t that is typically required by the vehicle manufacturers. For this reason, in the last-cited, not prior-published German patent application 10303706.3, a plurality of spring means (1; 1a; 1b; 31) are connected one behind the other inside the housing of the force measuring device within a particularly compact, stable and consequently particularly suitable rotationally symmetric force measuring device in order to lengthen the spring path and thereby reduce the spring constant, which is to say the spring hardness. This means, however, that a substantial amount of additional outlay is required during manufacture and for introducing the sequentially connected springs into the housing, as a result of which the manufactured product may become more expensive and therefore less attractive for a vehicle manufacturer.

SUMMARY OF THE INVENTION

The object of the present invention is to create as compact and lastingly dimensionally stable a force measuring device as possible having a nonetheless sufficiently low spring hardness, the structure of which force measuring device still remains particularly simple and therefore economical.

The object is achieved by a force measuring device according to claim 1.

Advantageous embodiments are set forth in the dependent claims, whereby any meaningful combination of features of the dependent claims with the main claim is conceivable.

The force measuring device according to the invention comprises a housing having a first housing part and a second housing part which are connected to each other, as a result of which there is formed within the housing a cavity into which a deflection sensor is introduced. On the outside of the housing are mounted onto the first and the second housing part in each case a force introduction means, both of which are resiliently movable along a common movement axis due to the action of an in each case opposite force onto the first and second force introduction means, respectively. A displacement in opposite directions of this kind is registered by the deflection sensor and converted into an electrical signal which is conveyed out of the housing and used, for example, for a central control device of an occupant protection system in a vehicle as a metric for the weight force acting on the housing. According to the invention the resilient movement is made possible by means of both the first housing part and the second housing part, which thus represent a first and second spring means, respectively, of the force measuring device. As a result of the fact that, in contrast to the force measuring device of the last-cited US patent specification, a second housing cover is now also used, the two housing parts can each consist of very hard materials which also remain permanently dimensionally stable over the course of, for example, a long vehicle life when subject to a permanent load acting upon them at their place of installation between vehicle seat and vehicle chassis, but nevertheless are suitable as spring means owing to the effective sequential connection of the two housing covers, or to express it in different terms: Because the second resilient spring cover is connected sequentially to the first spring cover, the spring constant of the overall spring formed in the process becomes smaller.

The force measuring device according to the invention can be used above all in conjunction with deflection sensors which are capable of registering the relative movement of the force introduction means with respect to one another. Preferably the deflection sensor consists of two halves, a first deflection sensor half which is rigidly connected to the first force introduction means and, in addition, a second deflection sensor half which is rigidly connected to the second force introduction means. The connection of the two deflection sensor halves to the associated force introduction means in each case can be realized in a variety of ways, for example by welding, adhesive bonding, etc.

In order to be able also to register the maximum displacement of the force introduction means to maximum effect, the deflection sensor is preferably disposed along the movement axis.

A suitable deflection sensor is, for example, an inductive sensor, preferably an induction coil which comprises a core in the first deflection sensor half and a coil winding in the second deflection sensor half.

Alternatively, however, other sensors can also be used, for example Hall sensors or magnetoresistive sensors, which have been known for a long time from the technical and patent literature.

As equal and opposite forces always act on the two housing parts as spring means in the direction of movement of the force introduction means, the two housing parts must remain dimensionally stable to the same extent at least up to a minimum requirement limit during their entire service life subject to the action of force. For this reason, in particular no excessively unequal material stress due to unequal spring constants of the two housing parts should preferably result. Preferably the spring constants of the two spring means are therefore equal, and should at least not differ too much from one another, in particular by not more than 75%.

In order to equip the two housing parts of the force measuring device according to the invention with the smallest possible spring constants, outside of the movement axis of the force introduction means the two housing parts each have a spring lever which is preferably led away vertically from the movement axis.

The overall force measuring device can be implemented in a particularly robust and dimensionally stable manner if as many components as possible of the force measuring device are arranged preferably rotationally symmetrically around the movement axis. This relates mainly to the housing parts and also to the force introduction means and the deflection sensor itself.

The force measuring device can be manufactured particularly cost-effectively if as many parts of the force measuring device as possible are embodied in a single piece, for example the first housing part with the first force introduction means mounted thereon or also the second housing part with the second force introduction means mounted thereon. This relates also, for example, to stop elements which mechanically limit a maximum possible deflection of the first and the second housing parts in each direction along the movement axis, for example a stop edge inside the housing of the force measuring device which prevents an excessive deflection of the two housing parts.

The invention is described below with reference to schematic diagrams of advantageous embodiments of the force measuring device according to the invention. The same reference characters are used in all cases for the same elements. The figures show:

DESCRIPTION OF THE PREFERRED EMBODIMENTS

Figure 1:
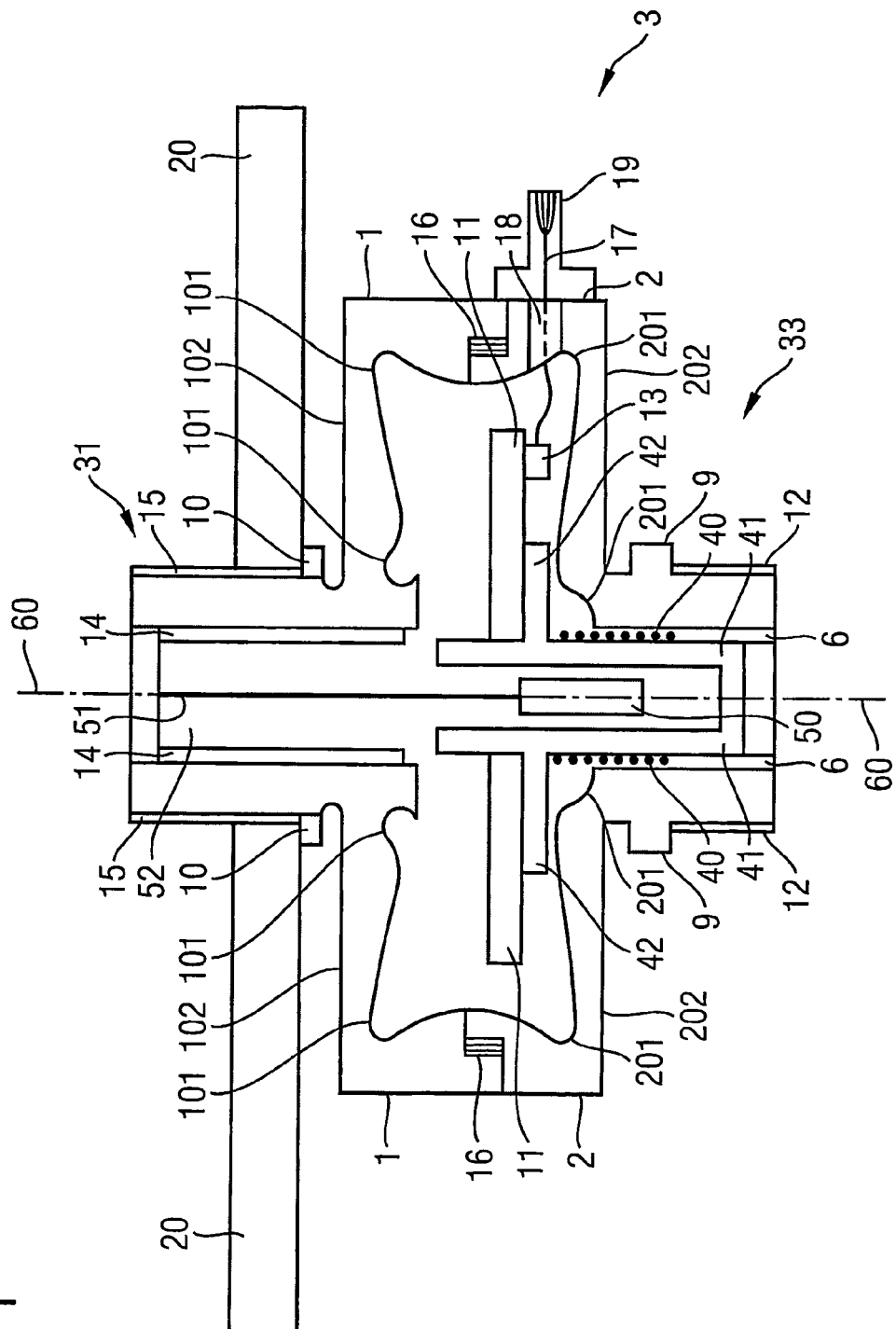
FIG. 1 a schematic cross-section through an exemplary embodiment of a force measuring device (3) according to the invention, FIG. 2 a schematically represented printed circuit board (11) for electronic components for evaluating the sensor signals of the deflection sensor (40, 50, 51, 52), FIG. 3 a schematic cross-section through an exemplary embodiment of a force measuring device (3) according to the invention having an integrated stop element (7) as overload protection against material damage to the force measuring device (3), FIG. 4 a schematically perspective representation of a force measuring device (3) according to the invention having an overload protection screw (70) mounted outside the housing (1, 2) of the force measuring device (3) and FIG. 5 a schematic cross-section through the representation from FIG. 4.

FIG. 1 shows a cross-section through a preferred exemplary embodiment of a force measuring device 3 according to the invention with a rotationally symmetric housing 1, 2 around a rotational axis 60 drawn in as a dashed line, said housing consisting of a first housing part 1 and a second housing part 2 which are joined together via a connecting means 16 and enclose a cavity, referred to in the following as interior for short.

The areas lying outside of the housing interior will be referred to in the following as exterior for short.

In this case the connecting means 16 may be a screw connection, an adhesive bond or, what is particularly preferred, a circumferential welded joint, since a welded joint is particularly capable of withstanding load and furthermore adds less weight to the overall weight of the force measuring device 3 than a screw connection using screw threads. Externally, centrally between two cross-sectional points through the housing 1, 2, there is mounted on the first housing part 1, forming a single piece therewith, a first force introduction means 31. Analogously thereto, a second force introduction means 33 is also mounted externally at the corresponding point of the second housing part 2. The force measuring device 3 is secured to a seat rail 20 by means of a screw thread 15 on the external surface of the first force introduction means 31, on which seat rail 20 a vehicle seat (not shown) is installed so as to be movable longitudinally. A corresponding screw thread 12 is provided on the external surface of the second force introduction means 33 for the purpose of connecting the force measuring device 3 to the vehicle chassis.

Arranged along the rotationally symmetric axis 60 of the force measuring device 3 running centrally between two cross-sectional points of the housing and vertically with respect to the welded seam 16, the force introduction means 31 and 32 are subject to weight or tensile force loading, for example due to a vehicle occupant seated on the motor vehicle seat, and are movable against a spring force which is caused by a deflection of the first housing part 1 and the second housing part 2. The rotational axis 60 therefore also represents the movement axis 60 of the two force introduction means.

The spring action of the first or second housing part 1, 2 is produced by sections 102 and 202 continuing vertically with respect to the movement direction axis 60, each of which sections in this way forms a circumferential spring lever 102 and 202, respectively, per housing part 1, 2. At the end of the respective spring lever 102, 202, the two housing parts 1, 2 are bent in a direction parallel to the movement direction axis 60 in such a way that they taper toward each other at their respective ends as far as their welded joint 16. The spring action of the lever arms 102 and 202 is reinforced by means of tapers 101 and 201 respectively to reduce the wall strength of the first and second housing part 1, 2, respectively, near to the movement direction axis 60 and near to the respective deflection points of the two lever arms 102 and 202 toward the welded seam 16.

The two housing parts 1 and 2 enclose a cavity. Arranged in said cavity is an inductive deflection sensor 40, 50, 51, 52 which consists of two sensor halves: The first sensor half 50, 51, 52 consists of a deflection sensor sleeve 52, made for example of plastic, which is rigidly connected to the inner wall of the first force introduction means 31 via a welded joint 14. The deflection sensor sleeve 52 is also located rotationally symmetrically around the movement axis 60. Along the movement axis 60, inside the deflection sensor sleeve 52 and permanently connected thereto, there runs a deflection sensor connecting means 51 as far as into the area of the cavity in the housing 1, 2 which is encased by the second housing part 2. A core 50 of an induction coil is fixed at that end of the deflection sensor connecting means 51. The associated winding 40 of the induction coil is permanently connected to the inner wall of the second force introduction means 33 and encases the coil core 50, also in a rotationally symmetric manner. It is wound around a coil body 41 which is connected to the second force introduction means 33 via a suitable connecting means 6, preferably in the same manner also as the deflection sensor sleeve 52 to the first force introduction means 31.

The coil body 41 has a printed circuit board retaining surface 42 which extends from the coil body 41 and therefore also from the movement direction axis 60 in a vertical direction into the housing cavity. Secured to said surface and arranged parallel to it is a disk-shaped printed circuit board 11 to which the signals of the induction coil 40 are routed and from which the signals, electronically conditioned if necessary, are led via a connecting lead 17 to a connector 19 outside the force measuring device. These signals are normally forwarded from the connector 19 to the central control device of an occupant protection system for further processing, in said device, of the weight signals obtained therefrom.

The coil signals are voltage changes at the coil 40 which are generated as a result of the coil cores 50 penetrating into the area of the coil winding 40 as soon as the two force introduction means 31, 33 start to move toward each other or, with reversed signal signs, when the two force introduction means 31 and 33 move away from each other.

Figure 2:
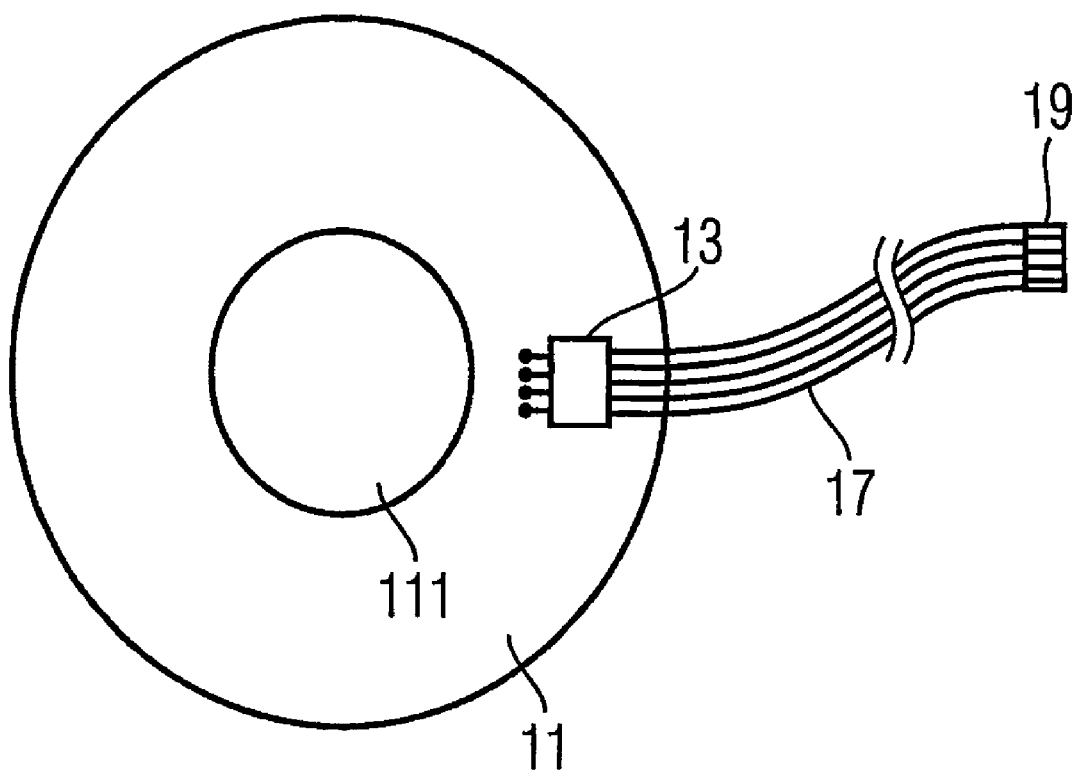

FIG. 2 shows the disk-shaped printed circuit board 11 from FIG. 1 in a plan view. The central cutout 111 serves to pass through the coil body 41. Also shown is a connecting element 13 which introduces the signals from the printed circuit board into the supply lead 17. Not shown in FIG. 2 are the switching elements required in order to condition the signal of the coil in the desired manner.

Figure 3:
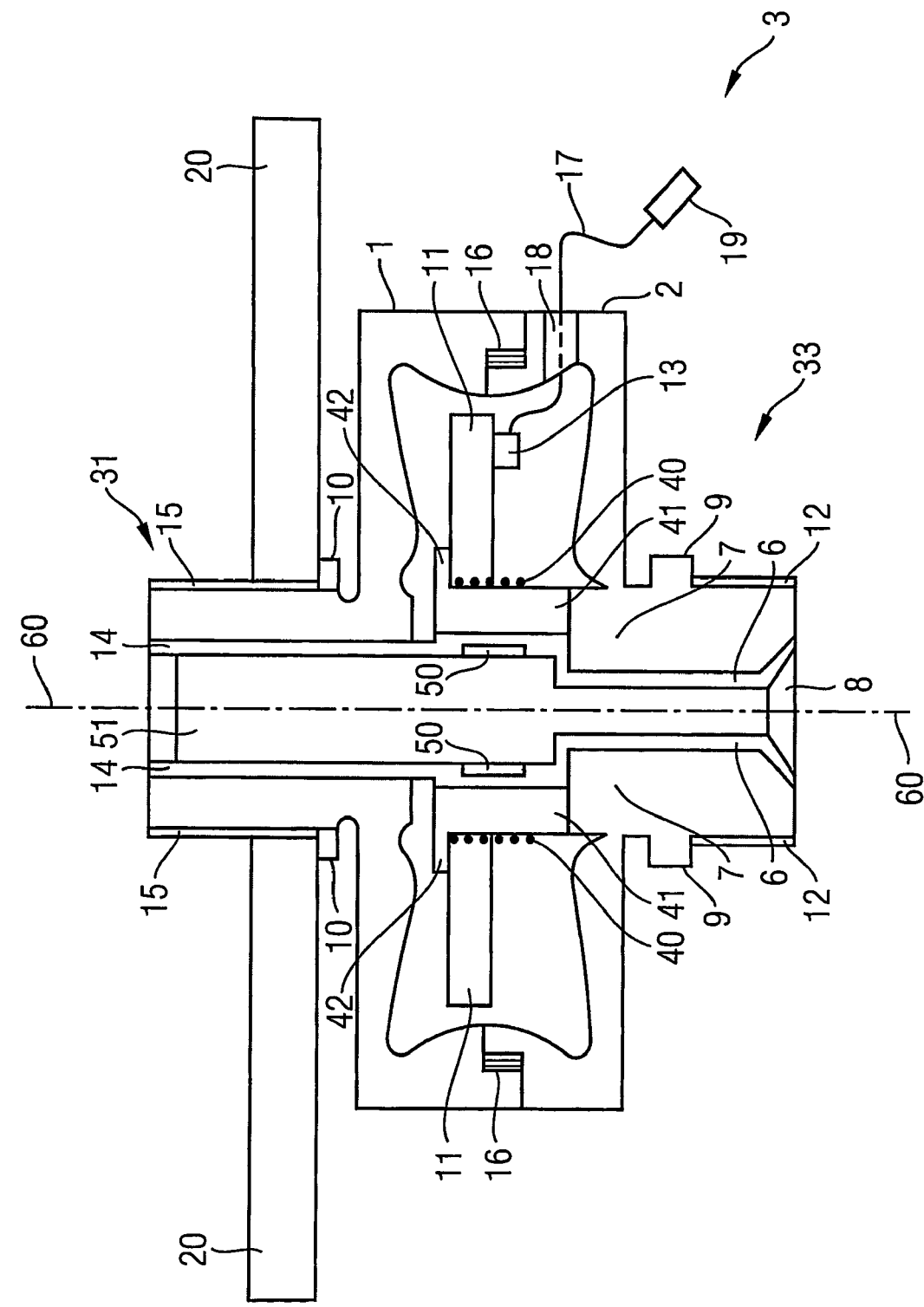

FIG. 3 essentially shows a force measuring device 3 like that in FIG. 1, although the inductive deflection sensor 40, 50, 51 is different from that shown in FIG. 1: Around a more extended deflection sensor connecting means 51 made of solid material, for example steel plate, there is attached, running circumferentially around it, roughly centrally between the two opposite ends of the two force introduction means 31 and 33, a suitable magnetic material 50 which, in a similar fashion to that shown in FIG. 1, forms the core 50 of a coil. The applied magnetic material is, for example, a highly permeable nickel-iron alloy, referred to as MU metal, with which the deflection sensor connecting means 51 is coated by vapor deposition. The coil winding 40 is in turn wound circumferentially around this coil core 50 onto a coil body 41 which surrounds the coil core rotationally symmetrically about the movement axis. In turn, in the same manner, printed circuit board retaining surfaces 42 are mounted onto the coil body 41 as in the case shown in FIG. 1, although in the exemplary embodiment shown in FIG. 3 the printed circuit board 11 is secured at the side of the printed circuit board retaining surface which faces the second housing part 33.

As a further difference compared to FIG. 1, stop elements 7 and 8 integrated in the housing can be seen in FIG. 3. The stop element 7 in the interior of the second housing part 2 is embodied as a projection from the material of the second housing part 2 in the direction of the first housing part 1. Opposite this projection 7 there lies a step in the material of the deflection sensor connecting means 51. As soon as the deflection sensor connecting means 51 moves too strongly in the direction of the second housing part 2, it strikes the projection 7 of the second-housing part 2 with this step and consequently is prevented from making a further deflection. The projection 7 is usually embodied running circumferentially around the part, narrowed by the step, of the deflection sensor connecting means 51.

A further stop element is identified by the reference numeral 8. However, said stop element 8 prevents an excessively strong deflection of the deflection sensor connecting means 51 in the direction of the first force introduction means 31. The second force introduction means 33 has centrally, at its free end, a taper which constricts the inner sheath area of the second force introduction means 33 in the direction of the housing interior. Lying opposite this taper there is disposed the end piece of the deflection connecting means 51, which has a parallel taper like the inner sheath of the second force introduction element 33. With displacements of the deflection connecting means 51 in the direction of the second force introduction means 33, this tapering section of the deflection sensor connecting means 51 constantly remains at a sufficient distance from the inner sheath of the second force introduction means 33. If, however, the deflection sensor connecting means 51 is pulled too far in the direction of the first force introduction means 31, the angularly narrowing taper of the deflection sensor connecting means 51 strikes the corresponding symmetrically circumferential taper of the second force introduction means 33, thereby preventing a further deflection in the direction of the first force introduction means 31.

Figure 4:
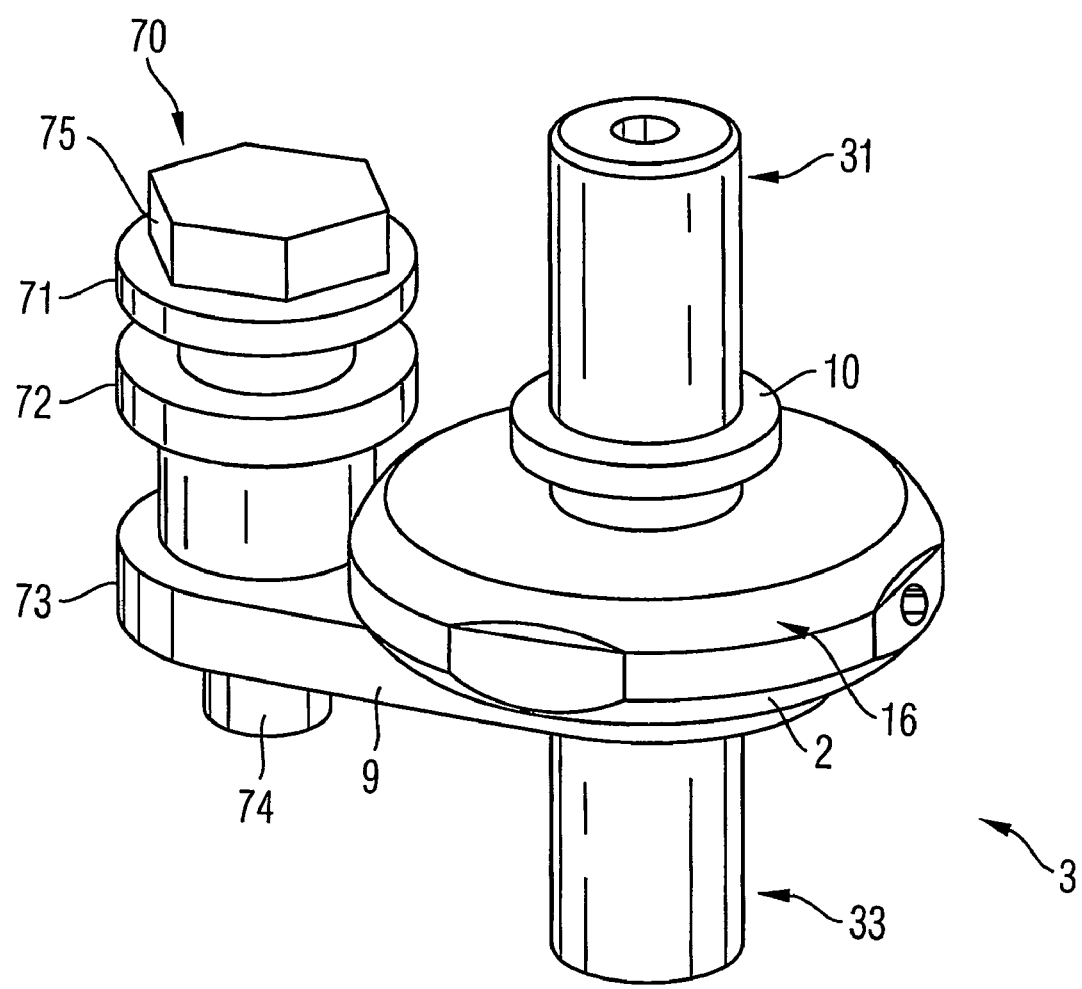

FIG. 4 shows in a schematically perspective representation a further embodiment of a force measuring device 3 according to the invention as similarly known already in part from FIGS. 1 and 3. In addition, however, the force measuring device 3 shown in FIG. 4 has an overload protection screw 70 having a screw head 75 and, at the opposite end of the screw 70 therefrom, having a screw thread 74. Between its screw head 75 and its thread 74, the overload protection screw 70 has a first stop element 71 parallel to the screw head 70. The overload protection screw 70 is screwed into a second stop element 72. The stop element 72 is rigidly connected via a connecting means 73 to the second force introduction element 33, for example by means of a welded joint having a second securing spacer element 9 running circularly around the second force introduction means 33, which spacer element keeps the second resilient housing part 2 at a distance from the screwing point of the second force introduction means 33 to the vehicle chassis, as can be seen in FIG. 5, which represents a cross-sectional view of the schematic illustration shown in FIG. 4.

Figure 5:
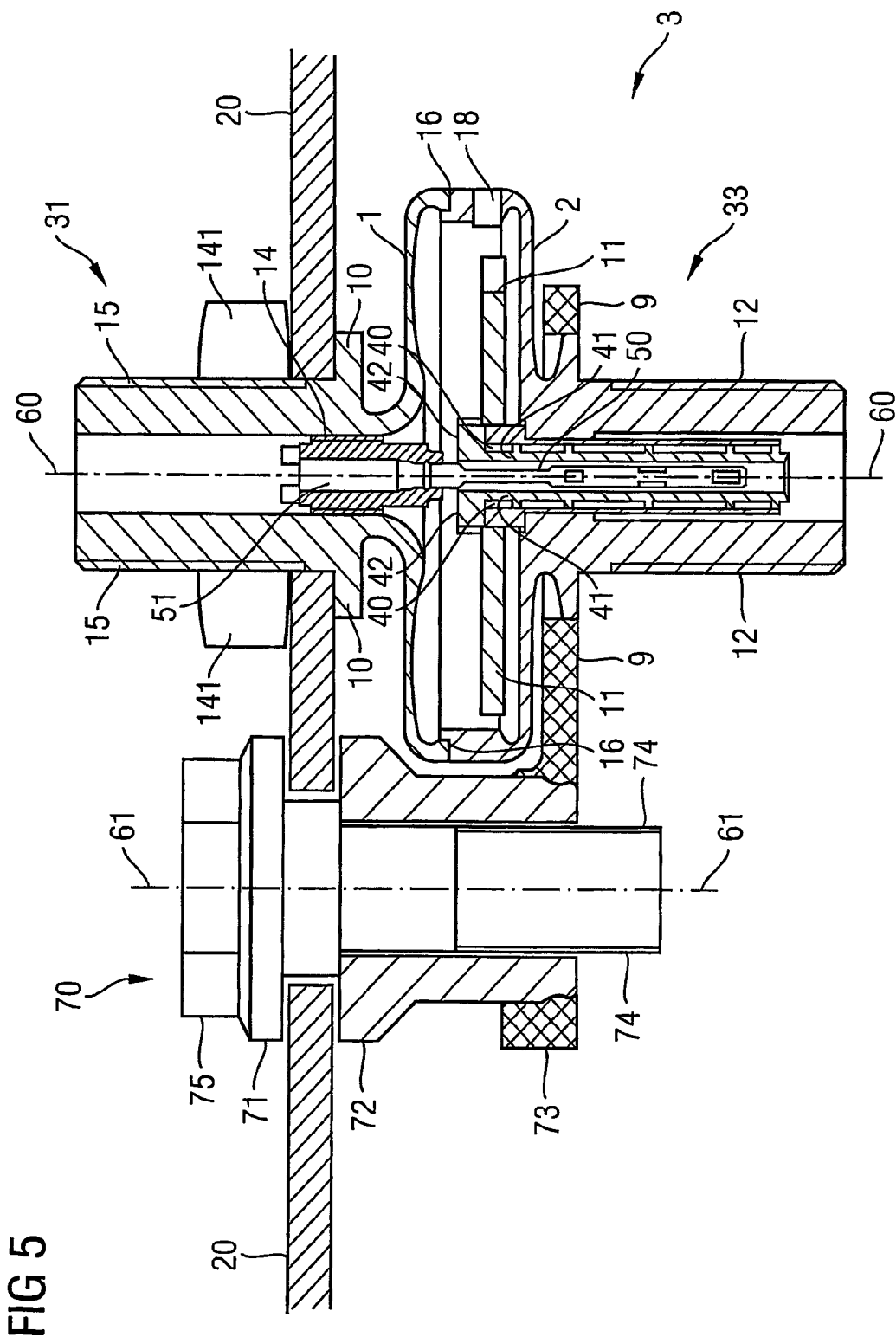

FIG. 5 also shows that the overload protection screw 70 is guided along its rotational axis 61 (indicated by the drawn-in dashed line) parallel to the movement axis 60 through a cutout of the mounting rail 20, whereby the screw head 75 and the first stop element 71 have a larger parallel surface extension than the cutout and therefore cannot be guided all the way through the cutout. Consequently only the screw body with the screw thread 74 projects through the cutout and is there screwed to the stop element 72 which also has a larger parallel surface extension than the cutout through the seat rail 20.

The first stop element 71 on the side of the seat rail 20 facing toward the screw head 75 is held parallel thereto at a distance from the seat rail 20. Similarly, the second stop element 72 is also kept at a distance from the seat rail 20 on the side of the seat rail 20 correspondingly facing away from the screw head. On the other hand, the overload protection screw 70 is rigidly connected to the housing 1, 2 of the force measuring device 3.

The force measuring device 3 is rigidly connected to the seat rail 20. The first force introduction means 31 is guided out of the seat rail 20 through a further cutout, with the result that a circular first securing spacer 10, running circumferentially around the first force introduction means 31, comes into contact with the seat rail 20 between seat rail 20 and first housing part 1. The part of the first force introduction means 31 projecting through the cutout from the seat rail 20 has, around its circumference, a thread 15 which enables a permanent screw connection of the first force introduction means 31 to the seat rail to be realized by means of a lock nut 141, with the first securing spacer 10 serving as a counterholding means on the side of the seat rail 20 facing away therefrom. The first securing spacer 10 also ensures, in an analogous manner to the second securing spacer 9 at the second force introduction means 33, that the elastic deflections of the housing part 1 are not obstructed mechanically by the seat rail 20 or the fixing securing the force measuring device 3 to the seat rail 20.

If the housing parts 1, 2 are now too strongly deflected due to the action of a force along the movement direction axis 60, the overload protection screw 70 is also deflected via the rigid connection 73 until said deflection is stopped by the first stop element 71 of the overload protection screw 70 striking the mounting rail 20 or, if the second stop element 72 strikes the mounting rail 20 as a result of the deflection of the housing parts 1, 2 and the overload protection screw 70 from the correspondingly opposite side. In this way it is possible to prevent excessively strong deflections of the housing parts 1, 2 which could otherwise result in permanent elastic deformations of the housing parts 1, 2.

We claim:

1. A force measuring device, comprising:
   a housing formed of a resiliently flexible first housing part and a resiliently flexible second housing part connected to said first housing part;
   a first force introduction means associated with said first housing part, and a second force introduction means associated with said second housing part;
   wherein said first and second force introduction means are disposed to introduce mutually opposite force components into said first and second housing parts, respectively, and to resiliently move along a common movement axis upon being subjected to the respectively opposite force components directed in mutually opposite directions; and
   a deflection sensor for registering a movement of said first and second housing parts relative to one another.

2. The force measuring device according to claim 1, wherein said first and second housing parts are defined as spring means with spring constants having values that are different from one another by no more than a maximum of 75%.

3. The force measuring device according to claim 1, wherein said first and second housing parts are defined as spring means with spring constants of substantially equal value.

4. The force measuring device according to claim 1, wherein said first housing part includes a first spring lever forming said first spring means and said second housing part includes a second spring lever forming said second spring means, and said first and second spring levers are disposed in each case outside said movement axis.

5. The force measuring device according to claim 4, wherein said first and second spring levers extend substantially vertically with respect to said movement axis.

6. The force measuring device according to claim 1, wherein said deflection sensor is disposed along said movement axis.

7. The force measuring device according to claim 1, wherein said movement axis for said first and second housing parts and/or for said first and second force introduction means and/or for said deflection sensor defines a substantially rotationally symmetrical axis.

8. The force measuring device according to claim 1, wherein said first housing part is integrally formed in a single piece with said first force introduction means.

9. The force measuring device according to claim 8, wherein said second housing part is integrally formed in a single piece with said second force introduction means.

10. The force measuring device according to claim 1, which further comprises stop elements mounted to said housing and configured to limit a maximum possible deflection of said first and the second housing parts in each direction along said movement axis.

11. The force measuring device according to claim 8, wherein said stop elements include at least one internal stop element disposed inside said housing.

12. The force measuring device according to claim 11, wherein said internal stop element integrally formed in a single piece with one of said first and second housing parts.

13. The force measuring device according to claim 1, wherein said deflection sensor includes a first deflection sensor half rigidly connected, directly or indirectly, to said first force introduction means, and a second deflection sensor half rigidly connected, directly or indirectly, to said second force introduction means.

14. The force measuring device according to claim 13, wherein said deflection sensor is an inductive sensor.

15. The force measuring device according to claim 14, wherein said inductive sensor includes an induction coil with a core and a coil winding, and said first deflection sensor half comprises said core of said induction coil and said second deflection sensor half comprises said coil winding.

* * * * *